US009865057B2

(12) United States Patent
Lachner et al.

(10) Patent No.: US 9,865,057 B2
(45) Date of Patent: Jan. 9, 2018

(54) GENERATING SUPPLEMENTARY SLICE IMAGES BASED ON ATLAS DATA

(71) Applicant: Brainlab AG, Munich (DE)

(72) Inventors: Rainer Lachner, München (DE); Bálint Varkuti, München (DE); Andreas Blumhofer, Neubiberg (DE)

(73) Assignee: Brainlab AG, Munich (DE)

( * ) Notice: Subject to any disclaimer, the term of this patent is extended or adjusted under 35 U.S.C. 154(b) by 27 days.

(21) Appl. No.: 15/024,542

(22) PCT Filed: Sep. 30, 2013

(86) PCT No.: PCT/EP2013/070331
§ 371 (c)(1),
(2) Date: Mar. 25, 2016

(87) PCT Pub. No.: WO2015/043671
PCT Pub. Date: Apr. 2, 2015

(65) Prior Publication Data
US 2016/0232655 A1 Aug. 11, 2016

(51) Int. Cl.
*G06K 9/00* (2006.01)
*G06T 7/00* (2017.01)
(Continued)

(52) U.S. Cl.
CPC .............. *G06T 7/003* (2013.01); *G06T 7/337* (2017.01); *G06T 7/344* (2017.01);
(Continued)

(58) Field of Classification Search
CPC ................ G06K 9/00; G06T 7/00; A61B 5/00
(Continued)

(56) References Cited

U.S. PATENT DOCUMENTS 7,697,972 B2 * 4/2010 Verard ............... A61B 1/00071 600/407
8,577,115 B2 * 11/2013 Gering .................... G06T 7/174 382/132

OTHER PUBLICATIONS

Volkau et al. "Indirect interpolation of subcortical structures in the Talairach-Tournoux atlas" Medical Imaging 2004; Visualization, Image-Guided Procedures, and Display, edited by Robert L. Galloway, Jr., Proceedings of SPIE vol. 5367 (SPIE,Bellingham, WA, 2004).

(Continued)

*Primary Examiner* — Abolfazl Tabatabai
(74) *Attorney, Agent, or Firm* — Tucker Ellis LLP

(57) ABSTRACT

A medical data processing method of determining a virtual image (2) of a part of a patient's body (4), the method being constituted to be executed by a computer and comprising the following steps: a) acquiring (S1) patient image data describing at least two two-dimensional patient images (1) of anatomical body parts (3) of the patient's body (4); b) acquiring (S2) atlas data describing a general structure (5) of at least part of the patient's body comprising correspondence parts corresponding to the anatomical body parts (3); c) acquiring correspondence part position data describing the positions of the correspondence parts in the general structure (5); determining (S4.1, S4.2, S4.3), based on the patient image data and the atlas data and the correspondence part position data, virtual image data describing a two-dimensional virtual image (2) of a part (21, 22) of the general structure (5) having a position in the general structure (5) which lies between the positions of the correspondence parts.

16 Claims, 4 Drawing Sheets

(51) Int. Cl.
*G06T 7/33* (2017.01)
*A61B 6/00* (2006.01)

(52) U.S. Cl.
CPC ............... *G06T 2207/10072* (2013.01); *G06T 2207/10116* (2013.01); *G06T 2207/20128* (2013.01); *G06T 2207/20221* (2013.01); *G06T 2207/30012* (2013.01); *G06T 2207/30016* (2013.01)

(58) Field of Classification Search
USPC ....... 382/128, 129, 130, 131, 132, 133, 134; 378/4, 8, 21–27, 901; 600/300, 410, 411, 600/425
See application file for complete search history.

(56) References Cited

OTHER PUBLICATIONS

Wenzhe et al. "Cardiac Image Super-Resolution with Global Correspondence Using Multi-Atlas PatchMatch" K. Mori et al. (Eds.) MICCAI 2013, Part III, LNCS 8151, pp. 9-16, 2013 © Springer-Verlag Berlin Heidelberg 2013.

Chintalapani et al."Statistical Atlas Based Extrapolation of CT Data" Medical Imaging 2010: Visualization, Image-Guided Procedures, and Modeling, edited by Kenneth H. Wong, Michael I. Miga, Proc. of SPIE vol. 7625, 762539-© 2010 SPIE.

Lamecker et al."Atlas-based 3D-Shape Reconstruction from X-Ray Images" Proceedings of the 18th International Conference on Pattern Recognition (ICPR'06) 0-7695-2521-0/06 © 2006 IEEE.

Dowling et al."An Atlas-Based Electron Density Mapping Method for Magnetic Resonance Imaging (MRI)-Alone Treatment Planning and Adaptive MRI-Based Prostate Radiation Therapy" Int J Radiation Oncol Biol Phys, vol. 83 No. 1, pp. e5-e11, 2012 © 2012 Elsevier Inc.

International Search Report for PCT/EP2013/070331; dated Mar. 17, 2014; p. 1-3, EPO, NL-2280.

European Patent Office, International Preliminary Report on Patentability for corresponding PCT/2013/070331, dated Apr. 5, 2016.

Herman et al., "Shape-based Interpolation", Article, IEEE Computer Graphics and Applications, IEEE Service Center, New York, NY, US, vol. 12 No. 3, May 1992, pp. 69-79, XP011417304, ISSN: 0272-1716, DOI: 10.1109/38135915.

H.Greenspan, "Super-Resolution in Medical Imaging", Article, The Computer Journal, vol. 52, No. 1, 2008, pp. 43-63, XP055055156, ISSN:0010-4620, DOI: 10.1093/comjnl/bxm075.

European Patent Office, Office Action, "Consultation by telephone with the applicant" dated Feb. 21, 2017 for parallel EP patent Application No. 13774107.0, dated Mar. 9, 2017, pp. 1-18.

* cited by examiner

GENERATING SUPPLEMENTARY SLICE IMAGES BASED ON ATLAS DATA

RELATED APPLICATION DATA

This application is a national phase application of International Application No. PCT/EP2013/070331 filed Sep. 30, 2013, published in the English language.

The present invention relates to a method, in particular a medical data processing method, of determining a virtual image of a part of a patient's body in which patient image data and atlas data are used to determine a two-dimensional virtual image of a part of a general structure described by the atlas data which has a specific position relative to parts of the general structure which correspond to specific anatomical body parts of a patient's body. The invention also relates to in particular a corresponding computer program and a computer executing such a program.

When generating a set of three-dimensional medical image information by application of a medical imaging modality such as magnetic resonance imaging or computed tomography imaging to an anatomical body part of a patient's body, not the entire anatomical body part may be described by the image information. Rather, gaps may be generated between the individual two-dimensional slice images depending on the imaging frequency and rotational and translational velocities of the used analytical device. Presently, these gaps in the image information are filled by generating virtual two-dimensional medical images (i.e. virtual slice images) by interpolating between adjacent slice images generated by imaging the anatomical body part. This, however, is associated with a comparably high error probability since the interpreted virtual slice images may not represent the patient's anatomy between the positions of patient-specific slice images with the desired accuracy.

A problem to be solved by the present invention therefore is to provide a method of determining virtual slice images for filling the gaps in between patient-specific slice images with a higher reliability than was possible before.

This problem is solved by the subject-matter of any appended independent claim. Advantages, advantageous features, advantageous embodiments and advantageous aspects of the present invention are disclosed in the following and contained in the subject-matter of the dependent claims. Different advantageous features can be combined in accordance with the invention as long as technically sensible and feasible. In particular, a feature of one embodiment which has the same or similar function of another feature of another embodiment can be exchanged. In particular, a feature of one embodiment which supplements a further function to another embodiment can be added to the other embodiment.

EXEMPLARY SHORT DESCRIPTION OF THE INVENTION

In the following, a description of specific features of the present invention is given which shall not be listed to limit the invention only to the features and combinations of features described in this section.

The present invention provide in particular a data processing method which determines virtual slice images (DRRs) from atlas data for supplementing gaps between patient slice images taken of a patient. To this end, a correspondence between anatomical structures (also called anatomical body parts) described by the patient slice images and corresponding structures (also called correspondence parts) described by the atlas data is established. DRRs of structures defined in the atlas data between the positions of the correspondence parts are generated from the atlas data from standard perspectives corresponding to the perspectives of the patient slice images. The patient slice images are then supplemented by the DRRs.

According to an embodiment, the invention provides comparably high-resolution DRRs of the correspondence parts in case the patient slice images do not reach the desired resolution.

GENERAL DESCRIPTION OF THE INVENTION

In this section, a description of the general and preferred features of the present invention is given.

In order to solve in particular the aforementioned problem, the invention provides a method (in particular a data processing method, more particularly a medical data processing method) of determining a virtual image of a part of a patient's body. The method is preferably constituted to be executed by computer and comprises the following preferred steps.

Preferably, patient image data is acquired which describes at least two two-dimensional patient images of (in particular disjunct, i.e. non-overlapping) anatomical body parts of the patient's body. The two-dimensional patient images are in particular slice images and are generated from medical image information which has been generated by applying a medical imaging modality (such as ultrasound, x-ray, computer tomography—CT, or magnetic resonance imaging—MR) to the anatomical body parts. The anatomical body parts may be any kind of anatomical body parts, in particular each one of the anatomical body parts comprises at least one of hard tissue (such as bony tissue or cartilage) and soft tissue (such as a part of the brain or an internal organ such as the heart or the stomach). The patient image data is preferably generated before execution of the disclosed method. According to an alternative embodiment, generation of the patient image data may also be part of the disclosed method.

Preferably, atlas data is acquired which describes a general structure of at least part of the patient's body. This part of the patient's body comprises in particular correspondence parts which correspond to the anatomical body parts represented by the two-dimensional patient images. In particular, the atlas data describes an atlas of at least part of the patient's body. An atlas, also called anatomical atlas, is understood to represent a generic model (and therefore a general structure) of an anatomical structure forming at least part of the human body is generated based on a statistical analysis of anatomical information (in particular image information) generated from a plurality of human bodies. In the present case, the atlas preferably is an universal atlas which combines such statistical information for different types of patients (for example for patients of different ethnicities, gender, age and/or pathological state). Such an atlas is also called “universal atlas” (abbreviated as “UA”). Preferably, the atlas data also comprises representation class information about in particular tissue types described by the general structure. Further, preferably, the representation class information contains information about an association of at least one of contrast values and color values with specific physical structures (which may comprise for example fluids, such as liquids or gases, or tissue, in particular soft tissue and hard tissue) for specific medical imaging modalities, in particular for the medical imaging modality which was used to generate the patient image data.

The representation class information describes in particular the influence of the generating process for generating the patient image data on the representation of the physical structure which is imaged (i.e. the anatomical body parts of the patient's body). This influence is represented for example by a parameter set (such as for example scanning parameters) describing in particular the type of analytical device used to generate the patient image data and/or the measurement parameters which are set, in particular adjusted, on the analytical device and have an influence on the representation (i.e. in particular on at least one of the color values, first values and shape of an image of the image physical structure). Examples of the measurement parameters are the voltage of the x-ray tubes of an x-ray device or a computer tomograph, or the magnetic field strength issued by a magnetic resonance tomograph used to generate the patient image data. The parameter set represents and in particular comprises one or in particular more parameters which reflect and in particular are parameters which have an influence on the representation (in particular on the image appearance of the image elements in a medical image on the basis of which the atlas data is generated).

Preferably, the atlas data, in particular the description of the general structure, is adapted to reference data describing a reference patient. The reference patient may be the patient himself who is the subject of an envisaged medical procedure (such as a surgical procedure or a radio therapy procedure, which both, however, are not part of the disclosed method). In particular, the reference data comprises at least one of reference patient image data and patient meta data. For example, the reference data is acquired based on (in particular from) reference patient image data describing a three-dimensional image of the structure of the anatomical body part in the patient's body. For example, a computer tomography or a magnetic resonance tomography may be acquired of the anatomical body part of the patient himself. The resulting three-dimensional image may be fused with the atlas data (in particular with the general structure). The description of the general structure may then be adapted based on the result of such an image fusion, for example the general structure may be deformed (in particular translated and rotated) in order to fit to the anatomy (in particular the geometry, i.e. at least of shape and size) of the anatomical body part as described by the three-dimensional patient image. The atlas data may beforehand also have been individualized to fit to the patient, for example on the basis of patient meta information about in particular his gender, ethnicity, age, diagnosis (i.e. pathological state) or other patient-specific information. Also, the individualized atlas data (in particular the resulting individualized description of the general structure) may as part of the disclosed method have been translated into a representation of a different imaging modality before fusing the patient image with the universal atlas. Alternatively or additionally, the universal atlas may also be adapted to the aforementioned patient meta information without considering reference patient image data. For example, patient meta data comprising meta-information about the patient, the meta-information relating to at least one of for example patient's gender, ethnicity, age, size, weight and pathologic state, may serve as a basis for acquiring the reference data.

Preferably, correspondence part position data describing the positions of the correspondence parts in the general structure is acquired. In particular, the correspondence part position data describes the positions of parts of the general structure, which parts represent the anatomical body parts of the patient's body. These parts are called correspondence parts and correspond to the anatomical body parts in particular in function and anatomical designation. The correspondence part position data describes the positions of the correspondence parts in the reference system used to define positions in the general structure. The correspondence part position data is acquired preferably based on user input. For example, a user may input into a data processing device (such as a computer on which the disclosed data processing method is executed) information about the treatment classification (in particular about the pathological state of the patient and the affected anatomical body parts, in particular organs). The disclosed method then preferably acquires predetermined information on the basis of the information about the treatment classification, which predetermined information for example defines predetermined views of the relevant parts of the general structure. The relevant parts comprise in particular the correspondence parts and preferably the atlas representations of anatomical structures lying in between the correspondence parts. Alternatively or additionally, the correspondence part position data may be acquired by segmenting the patient images and searching the atlas data for structures being sufficiently similar to the image structures segmented from the patient images.

Preferably, indication data is determined based on the correspondence part position data. The indication data allows indicating the positions of the correspondence parts in the general structure. For example, the positions may be indicated by visually highlighting them in an image of the general structure which is output by a display device.

Preferably, virtual image data is determined based on the patient image data and the atlas data and the correspondence part position data. The virtual image data describes in particular a two-dimensional virtual image of a part of the general structure. This part of the general structure preferably has a position in the general structure (i.e. in the reference system used to define positions in the general structure) which lies between the positions of the correspondence parts. The virtual image preferably is a digitally rendered radiograph (DRR). The part of the general structure having a position between the positions of the correspondence parts is also called "supplement part" and the virtual image of that part is also called "supplement image". In particular, the supplement image serves to supplement the patient image data with an artificially produced medical image (i.e. a virtual image) of a region which is not described by the patient image data and in particular was not imaged as a slice image when generating the patient image data, for example due to the choice of the imaging frequency and the rotational and translational velocities of the analytic device used to generate the patient image data.

The position of the supplement part in the general structure is preferably described by three coordinate components. In particular at least one of these components has a value which lies between the values of the corresponding component of the positions of the correspondence parts (which are also described by preferably the same three coordinate components). Further preferably, at least of the two coordinate components of the position of the supplement part have values lie in between the values of the corresponding components of the positions of the correspondence parts. In particular, the supplement image is a slice image which covers the same slice surface as the two-dimensional patient images and lies on the same imaging axis (which is defined in particular by the direction of translational movement of the analytical device) as the two-dimensional patient images. The position of the supplement image on that axis lies in between the positions of the patient images, preferably the position of the supplement part lies in the middle between the positions of the patient images on the imaging axis.

Preferably, the patient image data describes imaging information about the imaging process with which the patient image was generated. The imaging information contains in particular information about the type of imaging modality used for the imaging process and also information about the geometric parameters of the imaging process (for example about the imaging direction, i.e. the perspective from the analytical device towards the anatomical body parts, and the imaging distance) and preferably also about the physical parameters of the imaging process such as for example the x-ray tube voltage (in the case of the patient images being x-ray images or computer tomographies) or the magnetic field strength (in the case of the patient images being magnetic resonance tomographies).

Preferably, the imaging information is acquired based on information about an envisaged medical treatment. The information about the envisaged medical treatment may indicate for example that the envisaged medical treatment is a surgical procedure or radiation therapy. The information about the envisaged medical treatment is acquired for example by user input into a computer executing the disclosed data processing method. In particular, specific image information is associated with a specific envisaged medical treatment which is chosen by the user by inputting the information about the envisaged medical treatment. For example, specific pathological states (such as for example a typical tumor class) are associated with standard medical image views which are used to judge such pathological states. Thus, if the user chooses a specific envisaged medical treatment, the correspondence part position data and preferably also the patient image data are acquired such that the supplement image and preferably also the patient images show the supplement part and the anatomical body parts, respectively, in such a standard view, i.e. in particular in a standard perspective.

Preferably, the virtual image data describes at least two supplement images of the same supplement part, wherein the two supplement images represent views of the supplement part which were generated for example from different perspectives. The perspective in which any supplement image is generated is determined preferably based on the above-described imaging information obtained in the patient image data. From the plurality of supplement images (in particular from the at least two supplement images), preferably one supplement image is determined which matches the patient images best. To this end, the supplement images are compared with the patient images and the best-matching supplement image is determined based on the result of this comparison. The comparison is conducted preferably based on applying an image fusion algorithm (in particular an elastic fusion algorithm) to the supplement images and the patient images. In particular, the supplement images having the highest degree of similarity compared to the patient images is determined to be the best-matching supplement image. If it is however determined that none of the supplement images matches the patient images within a predetermined degree of accuracy, an imaging transformation comprises at least one of a rotational and a translational transformation is preferably applied to the supplement images such that at least one of the virtual images matches the patient images within the predetermined degree of accuracy. A transformation is in the context of this disclosure understood to be in particular a positional transformation, for example a mapping such as a coordinate transformation. Such a transformation maps positional information between reference systems (which can be embodied by coordinate systems) and can be embodied by a linear function described by a mapping matrix. In particular, the imaging transformation is an elastic fusion transformation which is capable of deforming the supplement image so that it fits to at least one, preferably all, of the patient images.

Preferably, the description of the general structure by the atlas data is updated based on the virtual image data. For example, a supplement image which has undergone the above-imaging transformation can be used as a basis for adapting the description of the general structure. For example, the general structure can be changed (for example by application of an elastic fusion algorithm) to fit to the transformed supplement image so that the description of the general structure is closer to the actual anatomy of the specific patient. Alternatively or additionally, such an update can be based on information about the deviation between a best-matching supplement image and the patient images. Such a deviation may be added to or subtracted from, respectively, the description of the general structure in order to adapt the description of the general structure to the anatomy of the specific patient. Alternatively or additionally, the atlas data is preferably adapted to aforementioned reference data.

The description of the general structure is in particular an image description of the general structure. Therefore, the atlas data comprises in particular image data and therefore an atlas image which describes the general structure. The atlas image is made up of preferably three-dimensional image elements, and preferably each image element is assigned a representation class described by the representation class data. In particular, the representation class data (and therefore the representation classes) describes a representation of the general structure independence on at least one medical imaging modality. The representation of the general structure encompasses in particular its image appearance, for example at least one of color values, contrast values, and shapes described by the atlas image. In particular, the representation class data describes the representation of the general structure in dependence on at least one of the absorption and the scattering of image radiation (for example ultrasound radiation or electromagnetic radiation such as x-rays or a magnetic field) applied by the medical imaging modality used to generate in particular the patient image data. Therefore, the atlas data may serve to generate a supplement image of the supplement part which has a specific image representation as if it had been generated by applying the imaging radiation (i.e. the imaging modality) used to generate the patient image data. Preferably, a distribution of representation classes of image elements surrounding the positions of the correspondence parts is determined. Such a distribution serves for example to determine representation classes which typically neighbour slice images of the correspondence parts which may be generated from the atlas data. Based on information about such typically neighbouring representation classes, the virtual image data and in particular the supplement image is then preferably determined.

Preferably, the resolution of the two-dimensional patient images is determined and on that basis, it is determined whether the resolution reaches at least a predetermined value. If it is determined that the resolution does not reach at least the predetermined value, preferably a virtual image of the correspondence parts is determined based on the atlas data and in particular the patient image data. This allows to create virtual images of the correspondence parts which are suitable to replace the patient images for further use if the patient images do not fulfill the respective quality criteria.

The invention also relates to the following alternative embodiment:

A medical data processing method of determining a virtual image of a part of a patient's body, the method being constituted to be executed by computer and comprising the following steps:
a) acquiring patient image data describing a two-dimensional patient image of an anatomical body part of the patient's body;
b) acquiring atlas data describing a general structure of at least part of the patient's body comprising a correspondence part corresponding to the anatomical body part;
c) determining the resolution of the two-dimensional patient image and determining whether the resolution reaches at least a predetermined value;
d) if it is determined that the resolution does not reach at least a predetermined value, determining, based on the patient image data and the atlas data, virtual image data describing a two-dimensional virtual image of the correspondence part.

The invention also relates to a program which, when running on a computer or when loaded onto a computer, causes the computer to perform one or more or all of the method steps described herein and/or to a program storage medium on which the program is stored (in particular in a non-transitory form) and/or to a computer on which the program is running or into the memory of which the program is loaded and/or to a signal wave, in particular a digital signal wave, carrying information which represents the program, in particular the aforementioned program, which in particular comprises code means which are adapted to perform any or all of the method steps described herein.

The invention is related in particular to the following technical issues and provides for example the following solutions to the respectively associated problems:

Increased Resolution

Problem: One of the difficulties of 2D-3D matching is different resolution of the images. Typically the 3D data set consists of slices with a distance which is large compared to the intraslice resolution and the pixel size of the 2D images. Hence, rendering of DRRs in directions approximately parallel to the slices results in visible staircase-like artefacts. These artefacts confuse any similarity measure and hamper matching.

Solution: Since the Universal Atlas is directly involved in tissue classification of the 3D (three-dimensional) images, the tissue classes can be made available in the resolution of the Universal Atlas. This resolution is much higher than that of a conventional 3D image, especially with respect to the slice distance. Thus, the stair case effect in the DRRs is minimized.

Small Field of View

Problem: Sometimes the 3D image only covers parts of the patient's anatomy, for example in a magnetic resonance image of the spine. It is not uncommon to acquire few sagittal slices such that just the spine itself is imaged. If a DRR corresponding to a lateral X-ray image is to be created, large parts of the anatomy can't be considered because they are not contained in the 3D image. This introduces additional dissimilarity between the X-ray image and the corresponding DRR and hampers matching.

Solution: Use the Universal Atlas to guess the distribution of tissue classes outside the scan volume of the 3D image, for example by considering the above-described neighbouring representation classes.

Spinal Application

Problem: Some applications require 2D-3D matching for a volume containing more than one vertebra. Matching of 2D X-ray images and 3D data may be not possible by means of a rigid transformation due to different bending state of the spine at the acquisition times of 3D and 2D images. Conventional 2D-3D matching just determines the pose of the 3D image in the virtual space of the projective geometry of the 2D images. Bending of the spine introduces a deformation which can't be handled by rotations and translations.

Solution 1: Perform a rigid 2D-3D matching (e.e. by applying a fusion algorithm) for each individual vertebra (information about individual vertebras from the Universal Atlas). This yields a different rigid transformation for each vertebra. Integrate these rigid transformation into a global (non-rigid) one that is rigid when restricted to each vertebra. Apply this deformation to the 3D image to reflect the current bending state of the spine.

Solution 2: Parameterize the bending state of the spine (e.g. as a circle and/or using a polynomial function) by few "bending parameters". Increase the search space (up to now rotations and translations) by the bending parameters. Optimize the bending parameters simultaneously with the pose parameters utilizing the augmented search space. This requires additional deformation of the 3D image prior to DRR generation. This deformation has the same globally non-rigid/locally rigid properties as mentioned before.

Imageless Application

This is analogous to 3D-3D matching of the Universal atlas to a patient scan. In the 3D-3D case a dense deformation field is computed and applied to the Universal Atlas. Here, the patient data consists of X-ray images. Consequently, the corresponding DRRs are directly rendered from the Universal Atlas' tissue classes.

Problem: Due to the projective nature of the 2D images, the relatively sparse information (compared to the 3D-3D case) and the likely existence of many local optima in the high-dimensional parameter space a 3D deformation grid is hard (or impossible) to obtain. Matching is likely to get stuck in a local optimum of the similarity measure and yield a poor result.

Solution: Too many degrees of freedom. Most degrees of freedom correspond to deformations of the Universal Atlas that are unrealistic in an anatomical sense.

Restrict the number of degrees of freedom to a few shape parameters capable of describing realistically the anatomical variation present in a population of individuals. Such a set of shape parameters can be obtained by, e.g., statistical shape models via Principal Component Analysis. This requires a prior analysis of a larger number of training shapes. Similar to the Spinal Application, the search space is augmented by the shape parameters and all parameters are optimized (either simultaneously or sequentially).

Utilization of Ultrasound Information for Intraoperative Image Updates

Problem: Intraoperative transducers are utilized in various surgical contexts to gain additional information about the intraoperative anatomical reality, but mostly without the direct integration of the gained information into a 3D model/simulation of the patient at hand. The information is also not utilized systematically to perform intraoperative image updates.

Solution: An intraoperative transducer can be equipped with a marker device so that the systems are aware of the transducer position relative to the registered patient. Based on the available preoperative imaging that has been processed with the Universal Atlas technology, the system is capable to integrate the approximate path of the sound waves relative to the patient anatomy and utilize knowledge on the absorption properties of tissue types to perform an intraoperative image update, hence allowing the construction of a simulated intraoperative MR through navigated 2D ultrasound updates (through the deviation of a simulated ultrasound image solely based on patient anatomy, universal atlas and transducer position and the actual recorded image).

More complex combinations of preoperative MR, intraoperative CT and casual navigated intraoperative ultrasound-based local image updates can also be envisioned, possibly integrated preoperative abnormity detection/pathology classification and the utilization of indication specific priors the intraoperative integration step (if tumour tissue properties and common craniotomy accesses are known these priors can be utilized in the simulations).

Definitions

In the following, definitions are given for the meaning of specific terminology used in this present disclosure. These definitions form part of the present disclosure.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, in particular computer-readable data storage medium comprising computer-usable, in particular computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, in particular a data processing device comprising a digital processor (central processing unit or CPU) which executes the computer program elements and optionally a volatile memory (in particular, a random access memory or RAM) for storing data used for and/or produced by executing the computer program elements. Within the framework of the present invention, a computer-usable, in particular computer-readable data storage medium can be any data storage medium which can include, store, communicate, propagate or transport the program for use on or in connection with the instruction-executing system, apparatus or device. The computer-usable, in particular computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can in particular include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or vibration element incorporated into an instrument).

The information on the imaging geometry preferably comprises information which allows the analysis image (x-ray image) to be calculated, given a known relative position between the imaging geometry analysis apparatus and the analysis object (anatomical body part) to be analysed by the x-ray radiation, if the object (anatomical body part) to be analysed is known, wherein "known" means that the spatial geometry (size and shape) of the analysis object is known. This means in particular that three-dimensional, "spatially resolved" information concerning the interaction between the analysis object (anatomical body part) and the analysis radiation (x-ray radiation) is known, wherein "interaction" means for example that the analysis radiation is blocked or partially or completely allowed to pass by the analysis object. The position and in particular orientation of the imaging geometry is in particular defined by the position of the x-ray device, in particular by the position of the x-ray source and the x-ray detector and/or in particular by the position of the multiplicity (manifold) of x-ray beams which pass through the analysis object and are detected by the x-ray detector. The imaging geometry in particular describes the position (in particular, the orientation) and the shape (for example, a conical shape exhibiting a specific angle of inclination) of said multiplicity (manifold). The position can in particular be represented by the position of an x-ray beam which passes through the centre of said multiplicity or by a position of a geometric object (such as a truncated cone) which represents the multiplicity (manifold) of x-ray beams. Information concerning the above-mentioned interaction is preferably three-dimensionally known, for example from a three-dimensional CT, and describes the interaction in a spatially resolved way for points and/or regions of the analysis object, in particular force all of the points and/or regions of the analysis object. Knowledge of the imaging geometry in particular allows a location of a source of the radiation (for example, an x-ray source) to be calculated relative to an image plane (for example, the plane of an x-ray detector). With respect to the connection between three-dimensional analysis objects and two-dimensional analysis images as defined by the imaging geometry, reference is made in particular to the following publications:

1. "An Efficient and Accurate Camera Calibration Technique for 3D Machine Vision", Roger Y. Tsai, Proceedings of the IEEE Conference on Computer Vision and Pattern Recognition. Miami Beach, Florida, 1986, pages 364-374
2. "A Versatile Camera Calibration Technique for High-Accuracy 3D Machine Vision Metrology Using Off-the-Shelf TV Cameras and Lenses", Roger Y. Tsai, IEEE Journal of Robotics and Automation, Volume RA-3, No. 4, August 1987, pages 323-344. See also http://www.cs.cmu.edu/~rgw/TsaiDesc.html
3. Publication by Ziv Yaniv, "Fluoroscopic X-ray Image Processing and Registration for Computer-Aided Orthopedic Surgery"
4. EP 08 156 293.6
5. U.S. 61/054,187

An atlas typically consists of a plurality of generic models of objects, wherein the generic models of the objects together form a complex structure. The atlas of a femur, for example, can comprise the head, the neck, the body, the greater trochanter, the lesser trochanter and the lower extremity as objects which make up the complete structure.

The atlas of a brain, for example, can comprise the telencephalon, the cerebellum, the diencephalon, the pons, the mesencephalon and the medulla as the objects which make up the complex structure. One application of such an atlas is in the segmentation of medical images, wherein the atlas is matched to medical image data, and the image data are compared with the matched atlas in order to assign a point (a pixel or voxel) of the image data to an object of the matched atlas, thereby segmenting the image data into objects.

Analytical devices use imaging methods and are in particular devices for analyzing a patient's body, for instance by using waves and/or radiation and/or energy beams, in particular electronic magnet waves and/or radiation, ultrasound waves and/or particle beams (which in the framework of this disclosure are all called imaging radiation). Analytical devices are in particular devices which generate images (for example, two-dimensional or three-dimensional images) of the patient's body (and in particular of internal structures and/or anatomical body parts of the patient's body) by analyzing the body. Examples of analytical devices are x-ray machines, computer tomographs, magnetic resonance tomographs or ultrasound probes.

In the field of medicine, imaging methods are used to generate image data (for example, two-dimensional or three-dimensional image data) of anatomical structures (such as soft tissues, bones, organs, etc.) of the human body. Medical imaging methods are understood to mean advantageously apparatus-based imaging methods (so-called medical imaging modalities and/or radiological imaging methods), such as for instance computed tomography (CT) and cone beam computed tomography (CBCT; in particular volumetric CBCT), x-ray tomography, magnetic resonance tomography (MRT or MRI), conventional x-ray, sonography and/or ultrasound examinations, and positron emission tomography. Analytical devices are in particular used to generate the image data in apparatus-based imaging methods. The imaging methods are in particular used for medical diagnostics, to analyse the anatomical body in order to generate images which are described by the image data. The imaging methods are in particular used to detect pathological changes in the human body.

The method in accordance with the invention is in particular a data processing method. The data processing method is preferably performed using technical means, in particular a computer. The data processing method is in particular executed by or on the computer. The computer in particular comprises a processor and a memory in order to process the data, in particular electronically and/or optically. The calculating steps described are in particular performed by a computer. Determining steps or calculating steps are in particular steps of determining data within the framework of the technical data processing method, in particular within the framework of a program. A computer is in particular any kind of data processing device, in particular electronic data processing device. A computer can be a device which is generally thought of as such, for example desktop PCs, notebooks, netbooks, etc., but can also be any programmable apparatus, such as for example a mobile phone or an embedded processor. A computer can in particular comprise a system (network) of "sub-computers", wherein each sub-computer represents a computer in its own right. The term "computer" includes a cloud computer, in particular a cloud server. The term "cloud computer" includes a cloud computer system which in particular comprises a system of at least one cloud computer and in particular a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing" which describes computation, software, data access and storage services which do not require the end user to know the physical location and/or configuration of the computer delivering a specific service. In particular, the term "cloud" is used as a metaphor for the internet (world wide web). In particular, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer in particular comprises interfaces in order to receive or output data and/or perform an analogue-to-digital conversion. The data are in particular data which represent physical properties and/or are generated from technical signals. The technical signals are in particular generated by means of (technical) detection devices (such as for example devices for detecting marker devices) and/or (technical) analytical devices (such as for example devices for performing imaging methods), wherein the technical signals are in particular electrical or optical signals. The technical signals in particular represent the data received or outputted by the computer.

The expression "acquiring data" encompasses in particular (within the framework of a data processing method) the scenario in which the data are determined by the data processing method or program. Determining data in particular encompasses measuring physical quantities and transforming the measured values into in particular digital data and/or computing the data by means of a computer, in particular computing the data within the method of the invention. The meaning of "acquiring data" in particular also encompasses the scenario in which the data are received or retrieved by the data processing method or program, for example from another program, a previous method step or a data storage medium, in particular for further processing by the data processing method or program. Thus, "acquiring data" can also for example mean waiting to receive data and/or receiving the data. The received data can for example be inputted via an interface. "Acquiring data" can also mean that the data processing method or program performs steps in order to (actively) receive or retrieve the data from a data source, for instance a data storage medium (such as for example a ROM, RAM, database, hard disc, etc.) or via the interface (for instance, from another computer or a network). The data can achieve the state of being "ready for use" by performing an additional step before the acquiring step. In accordance with this additional step, the data are generated in order to be acquired. The data are in particular detected or captured (for example, by an analytical device). Alternatively or additionally, the data are inputted in accordance with the additional step, for instance via interfaces. The data generated can in particular be inputted (for instance, into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. Thus, "acquiring data" can also involve commanding a device to obtain and/or provide the data to be acquired. The acquiring step in particular does not involve an invasive step which would represent a substantial physical interference with the body requiring professional medical expertise to be carried out and entailing a substantial health risk even when carried out with the required professional care and expertise. Acquiring, in particular determining, data in particular does not involve a surgical step and in particular does not involve a step of treating a human or animal body using surgery or therapy. This also applies in particular to any steps directed to determining data. In order to distinguish the different data used by the present method, the data are denoted (i.e. referred to) as "XY data" and the like and are defined by the information which they describe which is preferably called "XY information".

In this application, the term "image morphing" is also used as an alternative to the term "image fusion", but with the same meaning.

Elastic fusion transformations (e.g. image fusion transformation) are in particular designed to enable a seamless transition from one data set (e.g. first data set, e.g. first image) to another data set (e.g. second data set, e.g. second image). The transformation is in particular designed such that one of the first and second data sets (images) is deformed, in particular in such a way that corresponding structures (in particular, corresponding image elements) are arranged at the same position as in the other of the first and second images. The deformed (transformed) image which is transformed from one of the first and second images is in particular as similar as possible to the other of the first and second images. Preferably, (numerical) optimisation algorithms are applied in order to find the transformation which results in an optimum degree of similarity. The degree of similarity is preferably measured by way of a measure of similarity (also referred to in the following as a "similarity measure"). The parameters of the optimisation algorithm are in particular vectors of a deformation field F. These vectors are determined by the optimisation algorithm which results in an optimum degree of similarity. Thus, the optimum degree of similarity represents a condition, in particular a constraint, for the optimisation algorithm. The bases of the vectors lie in particular at voxel positions of one of the first and second images which is to be transformed, and the tips of the vectors lie at the corresponding voxel positions in the transformed image. A plurality of these vectors are preferably provided, for instance more than twenty or a hundred or a thousand or ten thousand, etc. Preferably, there are (other) constraints on the transformation (deformation), in particular in order to avoid pathological deformations (for instance, all the voxels being shifted to the same position by the transformation). The constraints include in particular the constraint that the transformation is regular, which in particular means that a Jacobian determinant calculated from a matrix of the deformation field (in particular, the vector field) is larger than zero. The constraints include in particular the constraint that the transformed (deformed) image is not self-intersecting and in particular that the transformed (deformed) image does not comprise faults and/or ruptures. The constraints include in particular the constraint that if a regular grid is transformed simultaneously with the image and in a corresponding manner, the grid is not allowed to interfold at any of its locations. The optimising problem is in particular solved iteratively, in particular by means of an optimisation algorithm which is in particular a first-order optimisation algorithm, in particular a gradient descent algorithm. Other examples of optimisation algorithms include optimisation algorithms which do not use derivations such as the downhill simplex algorithm or algorithms which use higher-order derivatives such as Newton-like algorithms. The optimisation algorithm preferably performs a local optimisation. If there are a plurality of local optima, global algorithms such as simulated annealing or genetic algorithms can be used. In the case of linear optimisation problems, the simplex method can for instance be used.

In the steps of the optimisation algorithms, the voxels are in particular shifted by a magnitude in a direction such that the degree of similarity is increased. This magnitude is preferably less than a predefined limit, for instance less than $1/10$ or $1/100$ or $1/1000$ of the diameter of the image, and in particular about equal to or less than the distance between neighbouring voxels. Due in particular to a high number of (iteration) steps, large deformations can be implemented.

The determined elastic fusion transformation can be in particular used to determine a degree of similarity (similarity measure also referred to as "measure of similarity") between the first and second data set (first and second image). To this end, the deviation of the elastic fusion transformation and an identity transformation is determined. The degree of deviations can be for instance calculated by determining the difference between the determinant of the elastic fusion transformation and the identity transformation. The higher the deviation is the less is the similarity. Thus, the degree of deviation can be used to determine a measure of similarity.

A measure of similarity can in particular be determined on the basis of a determined correlation between the first and second data set.

DESCRIPTION OF THE FIGURES

In the following, a preferred embodiment of the present invention is described with reference to the figures without limiting the invention to only those features which are illustrated by and described in connection with the figures, wherein.

Figure 1:
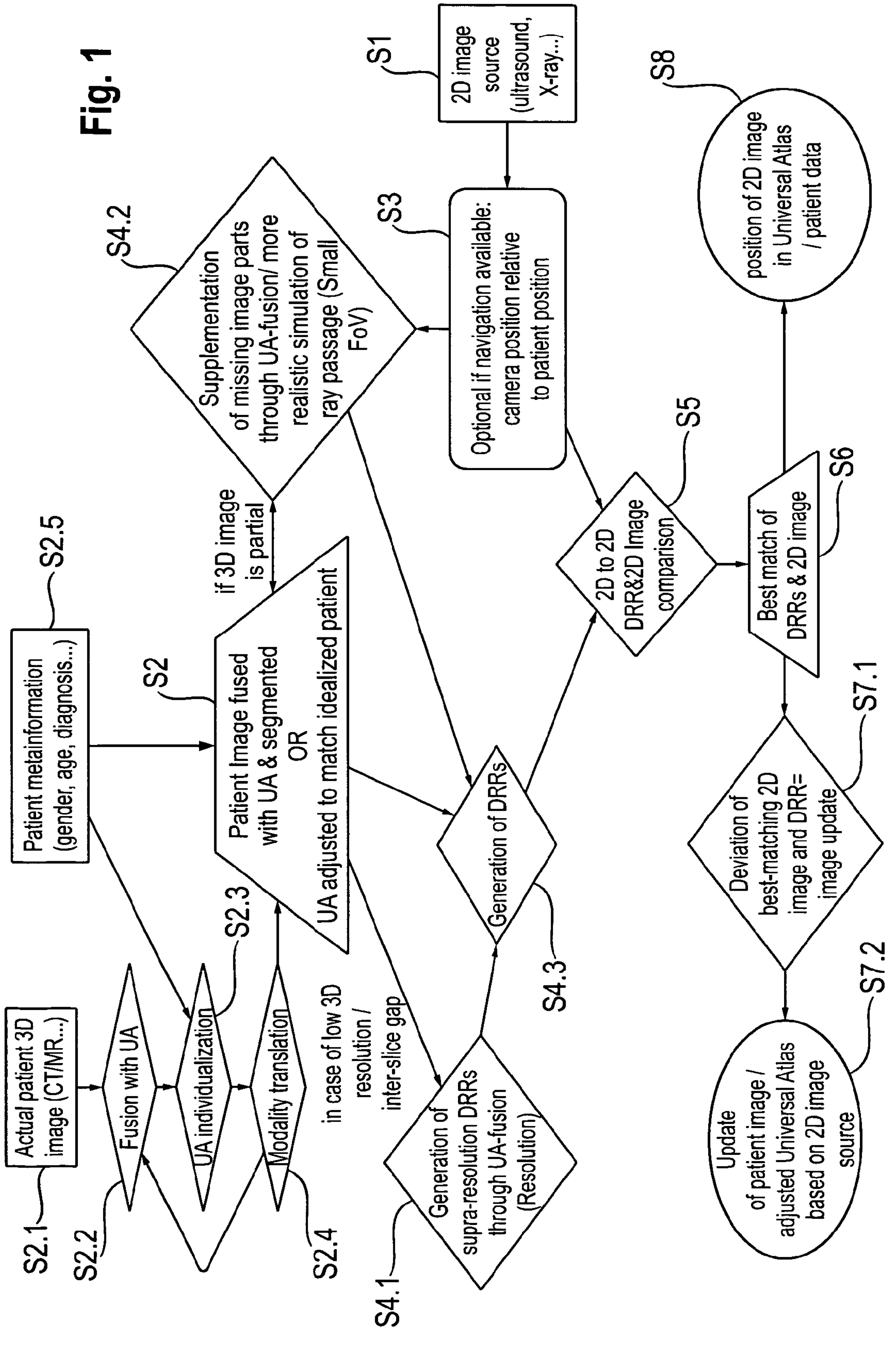
FIG. 1 is a flow diagram representing the inventive data processing method.

According to FIG. 1, the method starts with step S1 in which the patient image data describing at least two two-dimensional patient images 1 of anatomical body parts 3 of the patient's body 4 are acquired. In the example of FIG. 1, the patient image data may be acquired for example by applying an ultrasound or x-ray medical imaging modality to the patient's body 4. In step S2, the atlas data is acquired and the patient images 1 are fused with the atlas (also abbreviated UA for "universal atlas") and segmented in order to determine the correspondence part position data. Alternatively, the atlas data is adapted to reference data, i.e. adjusted to match an idealized patient. The reference data can be embodied by patient image data which may be acquired as an actual three-dimensional patient image (for example from a computer tomography or a magnetic resonance tomography) as shown in step S2.1. The three-dimensional patient image data can be fused with the atlas (step S2.2) in order to generate an individualization of the atlas (step S2.3) and, if necessary, can be translated into a representation corresponding to a representation of the three-dimensional patient image which appears as if it had been generated by applying the medical imaging modality applied in step S1 (so-called modality translation, step S2.4). The modality-translated three-dimensional patient image data can then, if required, be again fused with the atlas (as indicated by the arrow running from step S2.4 to step S2.2). Alternatively or additionally, the reference data can be embodied by patient meta information which can be acquired in step S2.5 and which can be used to individualize the atlas (step S2.3) or to adjust the atlas to match an idealized patient (step S2) without using three-dimensional patient image data. Based on imaging information which may be acquired in step S3 together with the patient image data, it can be determined in step S4.2 whether the two-dimensional patient image data requires supplementation since it misses image parts between slice images. In particular, this can be determined by comparing the correspondence part position data to the atlas data. If this comparison results in that the atlas data comprises positional information which defines positions in between the positions of the correspondence parts, this indicates that there are missing image parts, i.e. gaps between the slice images.

In a further embodiment of the invention, step S4.1 can be executed which determines whether the acquired two-dimensional patient images satisfy the demands on resolution and if it is determined that the resolution is too low, step S4.1 can be executed which relates to generation of super-resolution DRRs on the basis of the atlas data.

Virtual images of a part of the atlas are then generated as DRRs in step S4.3. The DRRs then constitute at least one of super-resolution DRRs which replace the two-dimensional patient image, and supplement images to supplement the two-dimensional patient images for positions in the patient's body 4 which were not imaged. The DRRs are also generated based on preferably the imaging information so that the DRRs are generated in the at least approximately same perspective relative to the supplement part as the two-dimensional patient images relative to the anatomical body parts.

In step S5, the DRRs are compared to the two-dimensional patient images for example by way of image fusion, in particular by applying an elastic fusion algorithm. As a result, information is obtained about the similarity between the two-dimensional patient images and the DRRs. In step S6 the DRRs is determined which best matches at least one of the two-dimensional patient images. On that basis, the method continues to at least one of steps S7.1 and S8. In step S7.1, a deviation of the best-matching DRRs and the two-dimensional patient image to which it has the best match is determined. The value of the deviation may then be used to update the two-dimensional patient image or adjust the atlas data in step S7.2. Alternatively or additionally, the position of the correspondence part or the supplement part in the universal atlas or the three-dimensional patient image can be determined and preferably highlighted in a display of the respective image information.

Figure 2A:
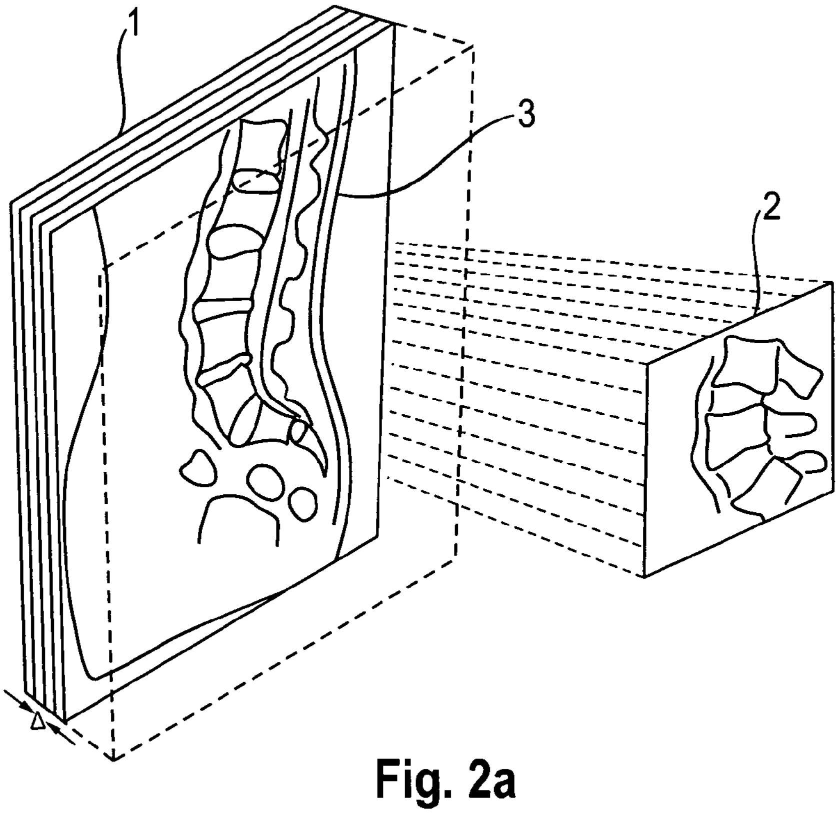
FIG. 2*a* illustrates the problem of having a gap in the image information at positions between slice images.
Figure 2B:
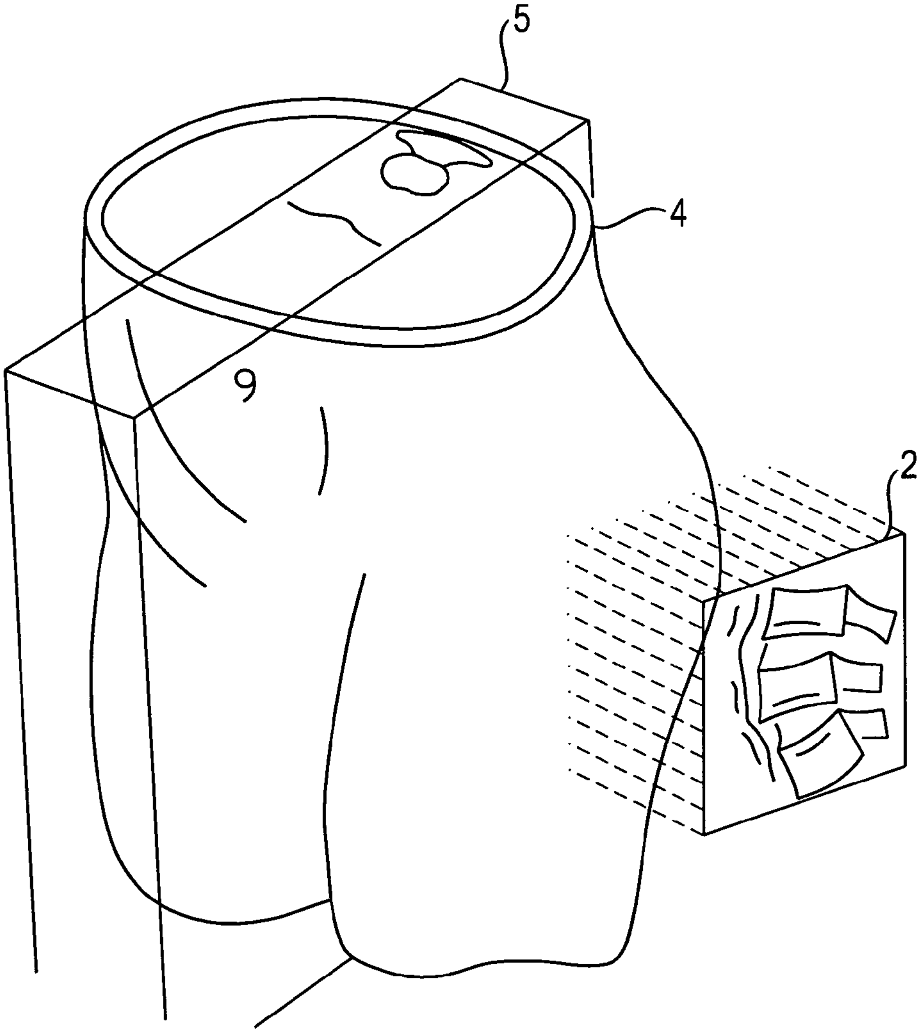
FIG. 2*b* illustrates the principle of simulating DRRs based on representation class data.

FIG. 2*a* gives an illustration of two-dimensional patient images embodied by slice images 1 which contain a representation of an anatomical body part 3 embodied by in particular the lower spine. As becomes evident from FIG. 2*a*, a gap Δ between the positions of the anatomical body parts (represented by each one slice image of a part of the spine) is caused when generating the patient image data. It is desirable to determine a virtual image 2 containing a representation of those parts of the patient's body which lie in a gapΔ. As shown in FIG. 2*b*, this is in accordance with the invention done by generating virtual images 2 on the basis of atlas data describing a general structure 5 of the part of the patient's body 4 in which the anatomical body parts 3 which were imaged in the two-dimensional patient images (slice images 1) are located. The atlas data contains in particular a representation class data which describes the representation (in particular image appearance) of tissue in the patient's body when applying a specific medical imaging modality that tissue. The representation class data is used to determine the image appearance of the non-imaged parts of the patient's body 4 (i.e. those "lying in the gaps Δ") based on the representation classes of those parts of the general structure 5 (in particular the correspondence parts) which correspond to the anatomical body parts 3 which are described by the slice images 1.

Figure 3A:
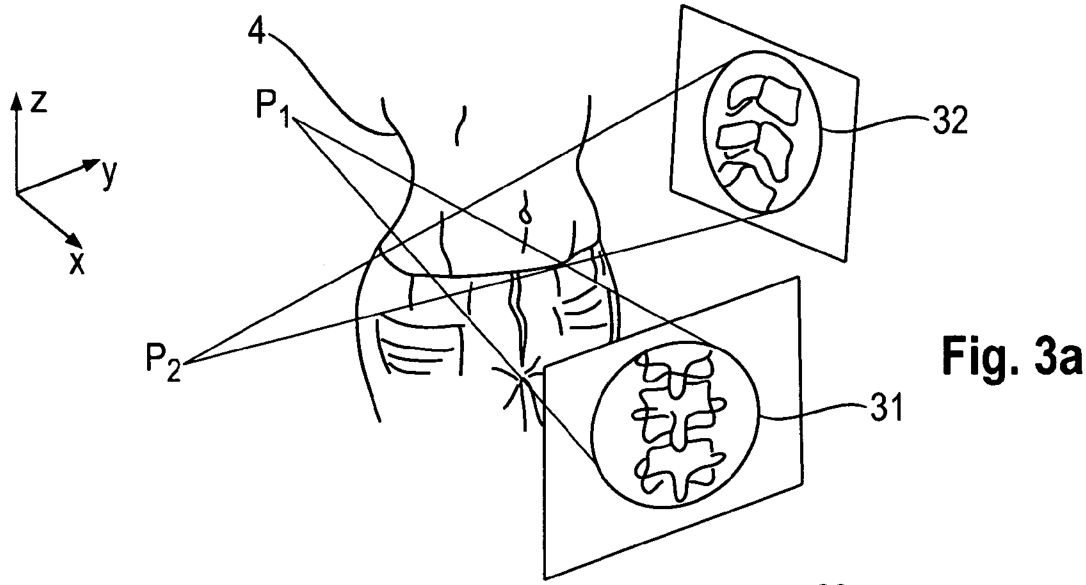
FIGS. 3*a* to 3*c* illustrate the principle of matching DRRs to patient image data.
Figure 3B:
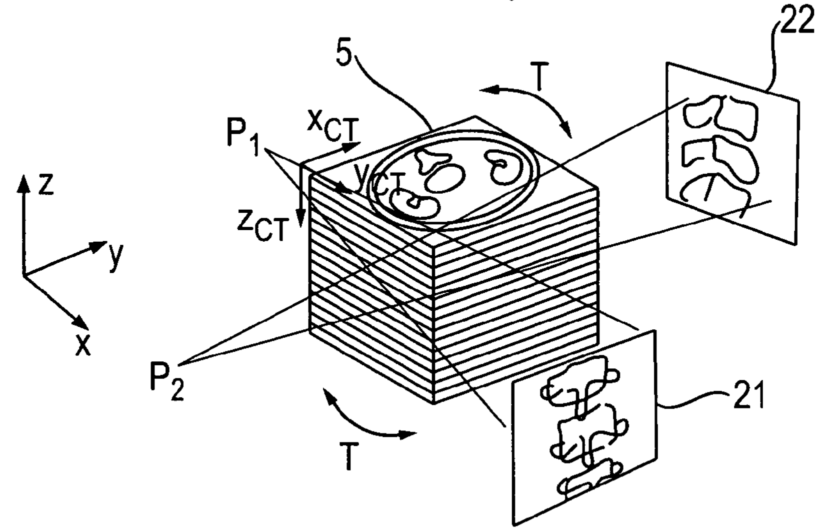
Figure 3C:
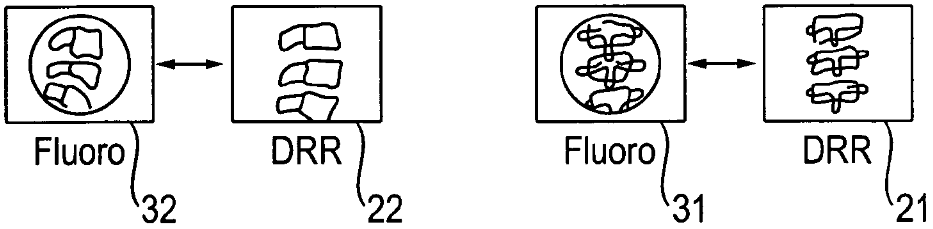

FIGS. 3*a* to 3*c* illustrate in particular the purpose of the imaging information. FIG. 3*a* shows how two-dimensional patient images 31, 32 are generated from different perspectives relative to the patient's body 4. The perspectives $P_1$ and $P_2$ are described by the imaging information. FIG. 3*b* illustrates how two-dimensional virtual images 21, 22 are generated by applying a virtual imaging process to the general structure 5 from the same perspectives $P_1$ and $P_2$ relative to the parts of the general structure 5 corresponding to the anatomical body parts 3 imaged in the context of FIG. 3*a*. If it is determined that the virtual images 21, 22 are not sufficiently similar to the patient images 31, 32, an imaging transformation T is determined which maps positions defined in the coordinate system (x, y, z) (which is used to define the positions of the perspectives) and positions defined in the coordinate system ($x_{CT}$, $y_{CT}$, $z_{CT}$) (which is used to define positions in the general structure 5) onto each other. Based on this imaging transformation T, the positional information describing the positions in the general structure can be subjected to at least one of translations and rotations defined by the imaging transformation T so that the representations of the correspondence parts or the supplement parts in the virtual images 21, 22 become sufficiently similar to the representations of the anatomical body parts in the patient images 31, 32. In the example of FIGS. 3*a* to 3*c*, two pairs of corresponding fluoroscopic patient images 31, 32 and two-dimensional virtual images embodied by each one DRR 21, 22 are determined.

The invention claimed is:

1. A digital image data processing system, comprising:

at least one data storage device and at least one computer, wherein the at least one data storage device comprises at least one database that is operably coupled to the at least one computer and stores patient image data describing at least two two-dimensional patient images of anatomical body parts of a patient's body, atlas data describing a general structure of at least part of the patient's body comprising correspondence parts corresponding to the anatomical body parts, and correspondence part position data describing the positions of the correspondence parts in the general structure;

wherein the at least one computer has at least one processor and at least one memory, wherein a program is running on the at least one processor or loaded into the at least one memory which, when executed by the at least one computer, causes the computer to execute steps of:

a) acquiring, at the at least one processor and from the at least one database, the patient image data;

b) acquiring, at the at least one processor and from the at least one database, the atlas data;

c) acquiring, at the at least one processor and from the at least one database, the correspondence part position data; and d) determining, by the at least one processor and based on the patient image data and the atlas data and the correspondence part position data, virtual image data describing a two-dimensional virtual image of a part of the general structure having a position in the general structure which lies between the positions of the correspondence parts, wherein the virtual image data describes at least two two-dimensional virtual images of the part of the general structure having the position in the general structure which lies between the positions of the correspondence parts, the method further comprising:

e) comparing, by the at least one processor, the virtual images with the patient images; and f) determining, by the at least one processor and based on comparing the virtual images with the patient images, which one of the virtual images matches the patient images best, wherein, if it is determined that none of the virtual images matches the patient images within a predetermined degree of accuracy, an imaging transformation comprising at least one of a rotational and a translational positional transformation is applied, by the at least one processor, to the virtual images such that at least one of the virtual images matches the patient images within the predetermined degree of accuracy.

2. A computer-implemented method of determining a virtual image of a part of a patient's body, the method comprising executing at least one processor of at least one computer, steps of:

a) acquiring, at the at least one processor and from a database located in a data storage device, patient image data describing at least two two-dimensional patient images of anatomical body parts of the patient's body;

b) acquiring, at the at least one processor and from a database located in a data storage device, atlas data describing a general structure of at least part of the patient's body comprising correspondence parts corresponding to the anatomical body parts;

c) acquiring, at the at least one processor and from a database located in a data storage device, correspondence part position data describing the positions of the correspondence parts in the general structure;

d) determining, by the at least one processor and based on the patient image data and the atlas data and the correspondence part position data, virtual image data describing a two-dimensional virtual image of a part of the general structure having a position in the general structure which lies between the positions of the correspondence parts, wherein the virtual image data describes at least two two-dimensional virtual images of the part of the general structure having the position in the general structure which lies between the positions of the correspondence parts, the method further comprising:

e) comparing, by the at least one processor, the virtual images with the patient images; and f) determining, by the at least one processor and based on comparing the virtual images with the patient images, which one of the virtual images matches the patient images best, wherein, if it is determined that none of the virtual images matches the patient images within a predetermined degree of accuracy, an imaging transformation comprising at least one of a rotational and a translational positional transformation is applied, by the at least one processor, to the virtual images such that at least one of the virtual images matches the patient images within the predetermined degree of accuracy.

3. The method according to claim 2, wherein the atlas data that includes the description of the general structure is adapted to reference data describing a reference patient.

4. The method according to claim 3, wherein the reference data comprises at least one of:

a. reference patient image data describing a three-dimensional image of the structure of the anatomical body parts in the patient's body; or b. patient metadata comprising meta-information about the patient, the meta-information relating to and indicating at least one of the patient's gender, ethnicity, age, size, weight, or pathologic state.

5. The method according to claim 2, wherein the virtual image is a digitally rendered radiograph.

6. The method according to claim 2, comprising updating, by the at least one processor, the description of the general structure by the atlas data based on the virtual image data.

7. The method according to claim 2, comprising determining, by the at least one processor and based on the correspondence part position data, indication data for indicating the position of the correspondence parts in the general structure.

8. The method according to claim 2, wherein the atlas data comprises representation class data describing a representation of the part of the general structure in the virtual image by describing representation classes of in body tissue or fluids.

9. The method according to claim 8, further comprising determining, by the at least one processor, a distribution of representation classes of image elements neighbouring the positions of the correspondence parts determining the virtual image data based on the distribution of representation classes.

10. The method according to claim 9, wherein the representation class data describes the representation of the general structure in dependence on at least one medical imaging modality in dependence on at least one of an absorption and a scattering of image radiation applied by the medical imaging modality used to generate the patient image data.

11. The method according to claim 2, wherein the patient image data contains imaging information about the imaging process with which the patient image data was generated.

12. The method according to claim 11, wherein the imaging information is acquired, at the at least one processor and from a database located in a data storage device, based on information about an envisaged medical treatment which is acquired by user input.

13. A non-transitory computer-readable program storage medium storing a program which, when on at least one processor of at least one computer or loaded into at least one memory of at least one computer, causes the at least one computer to execute a medical data processing method of determining a virtual image of a part of a patient's body, the method comprising executing at least one processor of at least one computer, steps of:

a. acquiring, at the at least one processor and from a database located in a data storage device, patient image data describing at least two two-dimensional patient images of anatomical body parts of the patient's body;

b. acquiring, at the at least one processor and from a database located in a data storage device, atlas data describing a general structure of at least part of the patient's body comprising correspondence parts corresponding to the anatomical body parts;

c. acquiring, at the at least one processor and from a database located in a data storage device, correspondence part position data describing the positions of the correspondence parts in the general structure; and d. determining, by the at least one processor and based on the patient image data and the atlas data and the correspondence part position data, virtual image data describing a two-dimensional virtual image of a part of the general structure having a position in the general structure which lies between the positions of the correspondence parts, wherein the virtual image data describes at least two two-dimensional virtual images of the part of the general structure having the position in the general structure which lies between the positions of the correspondence parts, the method further comprising:

e) comparing, by the at least one processor, the virtual images with the patient images; and f) determining, by the at least one processor and based on comparing the virtual images with the patient images, which one of the virtual images matches the patient images best, wherein, if it is determined that none of the virtual images matches the patient images within a predetermined degree of accuracy, an imaging transformation comprising at least one of a rotational and a translational positional transformation is applied, by the at least one processor, to the virtual images such that at least one of the virtual images matches the patient images within the predetermined degree of accuracy.

14. A digital image data processing system, comprising: at least one data storage device and at least one computer, wherein the at least one data storage device comprises at least one database that is operably coupled to the at least one computer and stores patient image data describing at least two two-dimensional patient images of anatomical body parts of a patient's body, atlas data describing a general structure of at least part of the patient's body comprising correspondence parts corresponding to the anatomical body parts, and correspondence part position data describing the positions of the correspondence parts in the general structure;

wherein the at least one computer has at least one processor and at least one memory, wherein a program is running on the at least one processor or loaded into the at least one memory which, when executed by the at least one computer, causes the computer to execute steps of:

a) acquiring, at the at least one processor and from the at least one database, the patient image data;

b) acquiring, at the at least one processor and from the at least one database, the atlas data;

c) acquiring, at the at least one processor and from the at least one database, the correspondence part position data;

d) determining, by the at least one processor and based on the patient image data and the atlas data and the correspondence part position data, virtual image data describing a two-dimensional virtual image of a part of the general structure having a position in the general structure which lies between the positions of the correspondence parts;

e) determining, by the at least one processor, a resolution of the two-dimensional patient images and determining, by the at least one processor, whether the resolution reaches at least a predetermined value; and f) if it is determined that the resolution does not reach at least the predetermined value, determining, based on the atlas data and in particular the patient image data, a virtual image of the correspondence parts.

15. A computer-implemented method of determining a virtual image of a part of a patient's body, the method comprising executing at least one processor of at least one computer, steps of:

a) acquiring, at the at least one processor and from a database located in a data storage device, patient image data describing at least two two-dimensional patient images of anatomical body parts of the patient's body;

b) acquiring, at the at least one processor and from a database located in a data storage device, atlas data describing a general structure of at least part of the patient's body comprising correspondence parts corresponding to the anatomical body parts;

c) acquiring, at the at least one processor and from a database located in a data storage device, correspondence part position data describing the positions of the correspondence parts in the general structure;

determining, by the at least one processor and based on the patient image data and the atlas data and the correspondence part position data, virtual image data describing a two-dimensional virtual image of a part of the general structure having a position in the general structure which lies between the positions of the correspondence parts, d) determining, by the at least one processor, a resolution of the two-dimensional patient images and determining, by the at least one processor, whether the resolution reaches at least a predetermined value; and e) if it is determined that the resolution does not reach at least the predetermined value, determining, based on the atlas data and in particular the patient image data, a virtual image of the correspondence parts.

16. A non-transitory computer-readable program storage medium storing a program which, when on at least one processor of at least one computer or loaded into at least one memory of at least one computer, causes the at least one computer to execute a medical data processing method of determining a virtual image of a part of a patient's body, the method comprising executing at least one processor of at least one computer, steps of:

a) acquiring, at the at least one processor and from a database located in a data storage device, patient image data describing at least two two-dimensional patient images of anatomical body parts of the patient's body;

b) acquiring, at the at least one processor and from a database located in a data storage device, atlas data describing a general structure of at least part of the patient's body comprising correspondence parts corresponding to the anatomical body parts;

c) acquiring, at the at least one processor and from a database located in a data storage device, correspondence part position data describing the positions of the correspondence parts in the general structure;

d) determining, by the at least one processor and based on the patient image data and the atlas data and the correspondence part position data, virtual image data describing a two-dimensional virtual image of a part of the general structure having a position in the general structure which lies between the positions of the correspondence parts, e) determining, by the at least one processor, a resolution of the two-dimensional patient images and determining, by the at least one processor, whether the resolution reaches at least a predetermined value; and f) if it is determined that the resolution does not reach at least the predetermined value, determining, based on the atlas data and in particular the patient image data, a virtual image of the correspondence parts.

* * * * *